US012650691B2

(12) United States Patent
Chung et al.

(10) Patent No.: US 12,650,691 B2
(45) Date of Patent: Jun. 9, 2026

(54) MOVING BODY AND METHOD FOR CONTROLLING MOVING BODY

(71) Applicants: Hyundai Motor Company, Seoul (KR); Kia Corporation, Seoul (KR); MOBINN Inc., Suwon-Si (KR)

(72) Inventors: Hoon Chung, Hwaseong-Si (KR); Jin Choi, Seoul (KR); Sun Myoung Jo, Ansan-Si (KR)

(73) Assignees: Hyundai Motor Company, Seoul (KR); Kia Corporation, Seoul (KR); MOBINN Inc., Suwon-Si (KR)

( * ) Notice: Subject to any disclaimer, the term of this patent is extended or adjusted under 35 U.S.C. 154(b) by 192 days.

(21) Appl. No.: 18/521,436

(22) Filed: Nov. 28, 2023

(65) Prior Publication Data

US 2025/0021097 A1     Jan. 16, 2025

(30) Foreign Application Priority Data

Jul. 14, 2023     (KR) ........................ 10-2023-0091972

(51) Int. Cl.
| | |
|---|---|
| *B60B 9/26* | (2006.01) |
| *G05D 1/00* | (2006.01) |
| *B60C 7/10* | (2006.01) |
| *B60W 30/18* | (2012.01) |
| *B60W 40/10* | (2012.01) |

(52) U.S. Cl.
CPC ............. *G05D 1/0223* (2013.01); *B60B 9/26* (2013.01); *B60C 7/107* (2021.08); *B60W 30/18009* (2013.01); *B60W 40/10* (2013.01)

(58) Field of Classification Search
CPC .. G05D 1/0223; B60B 9/26; B60B 2900/551; B60K 31/00; B60K 2031/0091; B60W 30/18009; B60W 40/10; B60W 2720/28; B60C 7/107; B60C 7/146; B60L 15/20; B62D 63/02; B60Y 2300/18008
See application file for complete search history.

(56) References Cited

U.S. PATENT DOCUMENTS

| | | | | |
|---|---|---|---|---|
| 4,705,087 A | * | 11/1987 | Markow | ................... B60C 7/14 |
| | | | | 152/12 |
| 5,050,656 A | * | 9/1991 | Ho | ............................ B60C 7/26 |
| | | | | 152/5 |

(Continued)

FOREIGN PATENT DOCUMENTS

| | | | | |
|---|---|---|---|---|
| CA | 3006801 | * | 12/2015 | ............... B60C 7/18 |
| CA | 3006801 A1 | * | 6/2017 | ............... B60C 7/18 |

(Continued)

OTHER PUBLICATIONS

Material and Design: A comprehensive review on non-pneumatic tyre research (Year: 2023).*

(Continued)

*Primary Examiner* — Fadey S. Jabr
*Assistant Examiner* — Ashutosh Pande
(74) *Attorney, Agent, or Firm* — Banner & Witcoff, Ltd.

(57) ABSTRACT

An apparatus may comprise a plurality of wheels, a body coupled to the plurality of wheels, and a controller configured to determine an angular velocity of the body with respect to a ground surface, and control, based on the angular velocity, a rotational speed of the plurality of wheels.

20 Claims, 12 Drawing Sheets

(56) References Cited

U.S. PATENT DOCUMENTS

| | | | | |
|---|---|---|---|---|
| 5,492,390 | A * | 2/1996 | Kugelmann, Sr. | B60B 19/00 |
| | | | | 301/5.1 |
| 6,032,710 | A * | 3/2000 | Milman | B60C 7/14 |
| | | | | 152/13 |
| 6,484,829 | B1 * | 11/2002 | Cox | B62D 57/028 |
| | | | | 180/8.1 |
| 6,915,878 | B2 * | 7/2005 | Kamen | A61G 5/14 |
| | | | | 180/7.1 |
| 8,527,177 | B2 * | 9/2013 | Linda | B60T 8/172 |
| | | | | 701/74 |
| 9,108,470 | B2 * | 8/2015 | Tercha | B60C 17/061 |
| 10,166,732 | B2 * | 1/2019 | Thompson | B60C 7/18 |
| 10,500,896 | B2 * | 12/2019 | Catalano | B60C 7/26 |
| 10,773,706 | B2 * | 9/2020 | Nozu | B60W 40/10 |
| 10,802,495 | B2 * | 10/2020 | Peret | G05D 1/0223 |
| 10,926,756 | B2 * | 2/2021 | Dastous | G05D 1/0077 |
| 10,953,696 | B2 * | 3/2021 | Thompson | B60C 11/0311 |
| 11,794,722 | B2 * | 10/2023 | Dastous | G05B 13/048 |
| 11,927,457 | B2 * | 3/2024 | Van Der Merwe | G05D 1/0274 |
| 12,240,440 | B2 * | 3/2025 | Dastous | A61G 5/1089 |
| 2004/0016594 | A1 * | 1/2004 | Yasui | B62D 6/04 |
| | | | | 180/446 |
| 2004/0019417 | A1 * | 1/2004 | Yasui | B60T 8/172 |
| | | | | 701/80 |
| 2006/0255924 | A1 * | 11/2006 | Ray | B60C 23/061 |
| | | | | 340/444 |
| 2009/0088918 | A1 * | 4/2009 | Takenaka | B60T 8/17551 |
| | | | | 701/31.4 |
| 2009/0204292 | A1 * | 8/2009 | Tate | B60T 8/175 |
| | | | | 701/41 |
| 2010/0084204 | A1 * | 4/2010 | Iwaki | B62D 55/075 |
| | | | | 180/9.52 |
| 2011/0071715 | A1 * | 3/2011 | Akimoto | B62K 11/06 |
| | | | | 701/22 |
| 2012/0221222 | A1 * | 8/2012 | Anderson | B60W 40/10 |
| | | | | 701/1 |
| 2014/0142753 | A1 * | 5/2014 | Ohm | B62D 55/075 |
| | | | | 901/1 |
| 2016/0031444 | A1 * | 2/2016 | Fairgrieve | B60W 40/04 |
| | | | | 701/93 |
| 2016/0114839 | A1 * | 4/2016 | Ohm | B62D 55/065 |
| | | | | 180/9.32 |
| 2018/0244327 | A1 | 8/2018 | Liivik et al. | |
| 2018/0281886 | A1 * | 10/2018 | Mizuno | B62D 9/02 |
| 2018/0290684 | A1 * | 10/2018 | Suda | B60W 30/04 |
| 2019/0001744 | A1 * | 1/2019 | Delfino | B60C 7/14 |
| 2019/0084416 | A1 * | 3/2019 | Watanabe | B60K 23/0808 |
| 2019/0128917 | A1 * | 5/2019 | Watanabe | B60W 30/00 |
| 2019/0202440 | A1 * | 7/2019 | Watanabe | B60W 10/04 |
| 2020/0031166 | A1 * | 1/2020 | Celik | B60C 7/14 |
| 2020/0087889 | A1 * | 3/2020 | Fritz | B60C 11/246 |
| 2020/0223249 | A1 * | 7/2020 | Christenbury | B60C 7/146 |
| 2020/0247180 | A1 * | 8/2020 | Kashiwai | B60C 7/146 |
| 2020/0276861 | A1 * | 9/2020 | Thompson | B60B 9/26 |
| 2021/0046934 | A1 * | 2/2021 | Witting | B60W 50/082 |
| 2021/0278851 | A1 * | 9/2021 | Van der Merwe | G06V 10/764 |
| 2022/0169255 | A1 * | 6/2022 | Sakagami | B60W 30/18172 |
| 2022/0324465 | A1 * | 10/2022 | Sakagami | B60W 40/068 |
| 2023/0047500 | A1 * | 2/2023 | Lafontaine | B62D 51/04 |
| 2024/0126266 | A1 * | 4/2024 | Jo | G01S 17/88 |
| 2024/0181805 | A1 * | 6/2024 | Lee | B60B 15/16 |

FOREIGN PATENT DOCUMENTS

| | | | | | |
|---|---|---|---|---|---|
| EP | 1961603 | | * | 8/2008 | B60K 23/04 |
| EP | 1961603 | A1 | * | 8/2008 | B60K 23/04 |
| GB | 2508462 | | * | 6/2014 | B62B 7/04 |
| GB | 2508462 | A | * | 6/2014 | B60T 8/175 |
| GB | 2620751 | | * | 6/2014 | B60C 7/18 |
| GB | 2620751 | A | * | 1/2024 | B62B 7/04 |
| JP | 2013-105186 | A | | 5/2013 | |
| JP | 2014-161991 | A | | 9/2014 | |
| KR | 101565945 | B1 | | 11/2015 | |
| KR | 10-2018-0108144 | A | | 10/2018 | |
| KR | 10-2020-0072032 | A | | 6/2020 | |
| KR | 10-2024-0053328 | A | | 4/2024 | |
| WO | WO2014027035 | | * | 2/2014 | B60W 30/182 |
| WO | WO-2014027035 | A1 | * | 2/2014 | B60W 30/182 |
| WO | WO2020018405 | | * | 1/2020 | B60C 11/0311 |
| WO | WO-2020018405 | A1 | * | 1/2020 | B60C 11/0311 |

OTHER PUBLICATIONS

Stair Climbing Robots : A review , IEEE Access (Year: 2023).*
Tyre effective radius and vehicle velocity estimation, 8th International Multi-Conference on Systems, Signals & Devices (Year: 2011).*
A comprehensive review on non-pneumatic tyre research : Material and Design 227 (2023) 111742 (Year: 2023).*
Stair-Climbing Robots: A review on Mechanism, Sensing and Performance Evaluation : IEEE Access (Year: 2023).*
Tyre effective radius and vehicle velocity estimation: 8th International Multi-Conference on Systems, Signals and Devices 2011 (Year: 2011).*

* cited by examiner

MOVING BODY AND METHOD FOR CONTROLLING MOVING BODY

CROSS-REFERENCE TO RELATED APPLICATION

This application claims the benefit of priority to Korean Patent Application No. 10-2023-0091972, filed in the Korean Intellectual Property Office on Jul. 14, 2023, the entire contents of which are incorporated herein by reference.

TECHNICAL FIELD

The present disclosure relates to a moving body, and a method for controlling the moving body.

BACKGROUND

A moving body may refer to an object that may be moved by using wheels or other means. Various forms of moving bodies could be developed. Among them, to overcome a limit of a wheel structure, a moving body that may go up and down an obstacle, such as a stair or a step, through flexible tires, by which the shapes of the wheels may be deformed, could be considered.

In a process of the moving body going up and down an obstacle, such as a stair or a step, the moving body may encounter a section, in which an angle between the moving body and a ground surface may rapidly change due to a step of the obstacle. If a movement speed of the moving body is constant while the moving body goes up the obstacle, front wheels of the moving body may collide with the next step whereby the moving body may receive a strong impact.

Furthermore, in a process of the moving body overcoming the step of the obstacle if the moving body travels while going down through rearward movement thereof, the rear wheels of the moving body may fall down at a relatively high acceleration whereby the moving body may receive a strong impact.

Accordingly, a technology of reducing an impact applied to the moving body by adjusting the movement speed of the moving body in a process of overcoming the obstacle is desirable.

SUMMARY

According to the present disclosure, an apparatus may comprise a plurality of wheels, a body coupled to the plurality of wheels, and a controller configured to determine an angular velocity of the body with respect to a ground surface, and control, based on the angular velocity, a rotational speed of the plurality of wheels.

The apparatus, wherein a wheel of the plurality of wheels is configured to be dynamically shaped as moving such that a first length of the wheel becomes smaller than a second length of the wheel, wherein the first length is a first distance between a first point, of the wheel, that contacts the ground surface, and a central axis of the wheel, and wherein the second length is a second distance between a second point, of the wheel, that does not contact the ground surface, and the central axis of the wheel.

The apparatus, wherein the plurality of wheels are rotated such that the body is moved forwards, and wherein the controller is configured to decrease the rotational speed of the plurality of wheels based on an absolute value of the angular velocity of the body being more than a first reference angular velocity.

The apparatus, wherein the plurality of wheels are rotated such that the body is moved forwards, and wherein the controller is configured to increase the rotational speed of the plurality of wheels until the rotational speed of the plurality of wheels reaches a reference rotational speed based on the absolute value of the angular velocity of the body being not more than the first reference angular velocity after the rotational speed of the plurality of wheels is decreased.

The apparatus, wherein the controller is configured to determine an angle of the body with respect to the ground surface, and wherein the plurality of wheels are rotated such that the body is moved forwards, and wherein the controller is configured to decrease the rotational speed of the plurality of wheels based on the absolute value of the angular velocity of the body being more than the first reference angular velocity and the angle of the body with respect to the ground surface being not less than a reference angle.

The apparatus, wherein a wheel of the plurality of wheels is configured to be dynamically shaped as moving such that a first length of the wheel becomes smaller than a second length of the wheel, wherein the first length is a first distance between a first point, of the wheel, that contacts the ground surface, and a central axis of the wheel, wherein the second length is a second distance between a second point, of the wheel, that does not contact the ground surface, and the central axis of the wheel, and wherein the controller is configured to determine the first reference angular velocity based on the first length and the second length.

The apparatus, wherein the plurality of wheels are rotated such that the body is moved rearwards, and wherein the controller is configured to decrease the rotational speed of the plurality of wheels based on an absolute value of the angular velocity of the body being more than a second reference angular velocity.

The apparatus, wherein the controller is configured to increase the rotational speed of the plurality of wheels until the rotational speed of the plurality of wheels reaches a reference rotational speed based on the absolute value of the angular velocity of the body being not more than the second reference angular velocity after the rotational speed of the plurality of wheels is decreased.

The apparatus, further may comprise a reception part coupled to an upper side of the body, wherein the plurality of wheels comprise front wheels coupled to a front side of the body, and rear wheels coupled to a rear side of the body, wherein a weight center of the body is formed on an upper side of the front wheels.

The apparatus, wherein each of the plurality of wheels includes a circular frame, a circular first impact absorbing member connected to an outside of the circular frame, an annular second impact absorbing member spaced apart from the circular first impact absorbing member in a radially outward direction, and a third impact absorbing member connecting one point of the circular first impact absorbing member and one point of the annular second impact absorbing member.

The apparatus, wherein the third impact absorbing member is configured to elastically support the annular second impact absorbing member against the circular first impact absorbing member. The apparatus, wherein the third impact absorbing member is extended in an inclined manner in a radial outward direction between the circular first impact absorbing member and the annular second impact absorbing member. The apparatus, wherein the third impact absorbing member is extended in a curved shape.

According to the present disclosure, a method may comprise determining, by a controller, an angular velocity of a body coupled to a plurality of wheels, determining whether a magnitude of the angular velocity is not less than a magnitude of a reference angular velocity, and adjusting, based on the determining, a rotational speed of the plurality of wheels.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
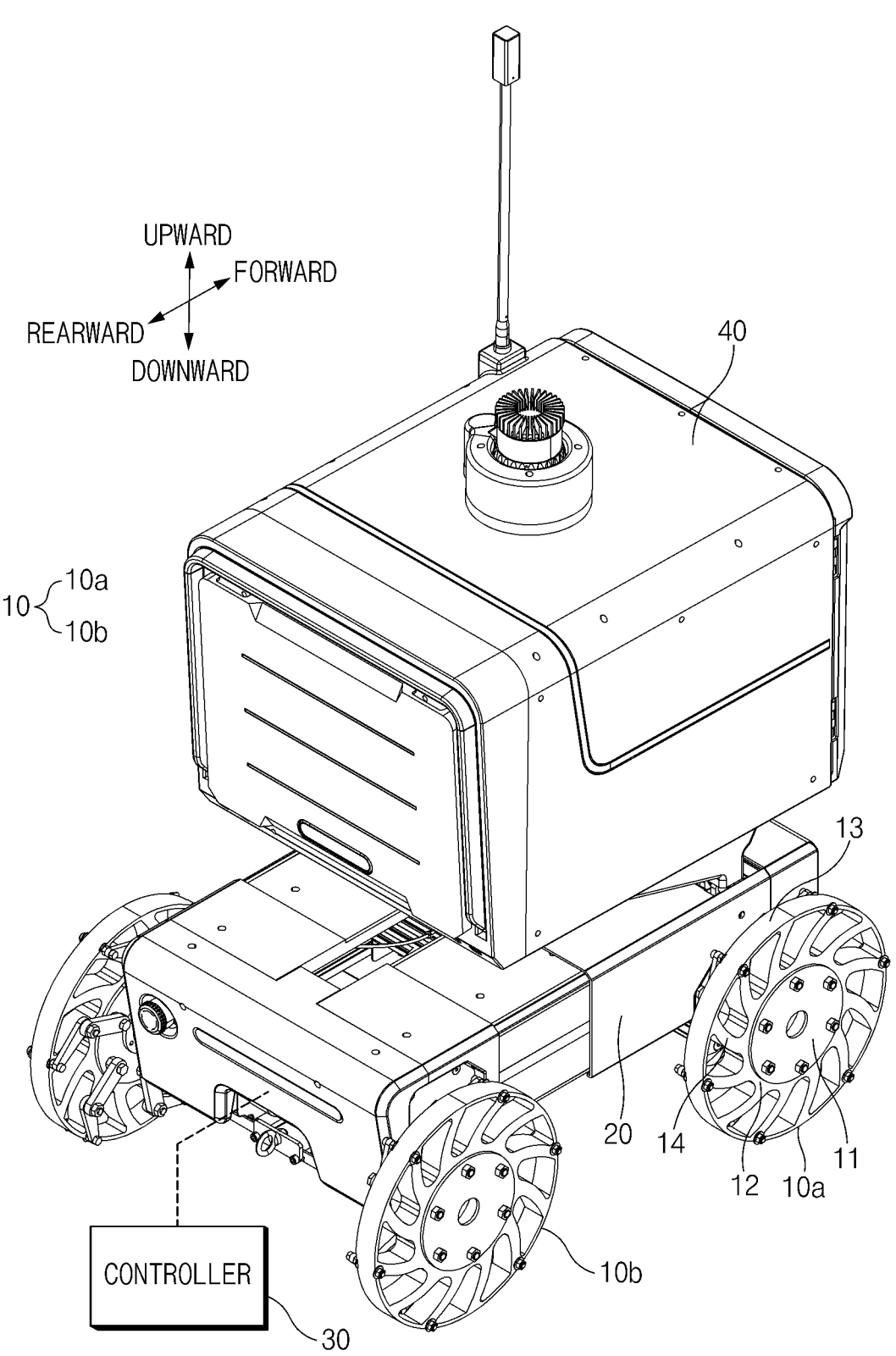
FIG. 1 shows an example of a moving body according to an example of the present disclosure.

Hereinafter, examples of the present disclosure will be described in detail with reference to the accompanying drawings. In adding reference numerals to the components of the drawings, it is noted that the same components are denoted by the same reference numerals even when they are drawn in different drawings. Furthermore, in describing the examples of the present disclosure, when it is determined that a detailed description of related known configurations and functions may hinder understanding of the examples of the present disclosure, a detailed description thereof will be omitted.

Hereinafter, a moving body may mean a structure, such as a vehicle, which may be moved through wheels 10 or other transportation means. A moving body according to an example of the present disclosure relates to a moving body that may go up and down obstacles, such as stairs or steps. Hereinafter, a description will be made with an assumption that the obstacle has a shape of stairs.

FIG. 1 shows an example of a moving body according to an example of the present disclosure.

The moving body according to the present disclosure may include wheels 10, a body 20, and a controller 30. The wheels 10 may be coupled to the body 20 to be rotatable. Furthermore, the wheels 10 may be configured to be rotated forwardly and reversely. As an example, the body 20 is provided with a plurality of motor members, and the wheels 10 may be connected to the motor members. However, the present disclosure is not limited thereto, and the wheels 10 may be rotated by an axle that connects the pair of wheels 10 as in a general vehicle.

The moving body according to an example of the present disclosure may further include a reception part 40. The reception part 40 may be a component for receiving an object in an interior thereof. The reception part 40 may be coupled to an upper side of the body 20. The reception part 40 may be disposed on a front side of an upper side of the body 20 to be inclined. Because the moving body further includes the reception part 40, a weight center of the moving body may be formed on an upper side of front wheels 10a.

As an example, the wheels 10 may be the wheels 10 that may be moved while overcoming obstacles, such as stairs and steps. The wheels 10 may include the front wheels 10a and rear wheels 10b.

As an example, each of the wheels 10 may include a frame 11, a first impact absorbing member 12, a second impact absorbing member 13, and a third impact absorbing member 14. The frame 11 may have a circular shape.

The first impact absorbing member 12 may be a circular member that is connected to an outside of the frame 11. The second impact absorbing member 13 may be an annular member that is spaced apart from the first impact absorbing member 12 in a radially outward direction. A center of the second impact absorbing member 13 may coincide with a center of the first impact absorbing member 12.

The third impact absorbing member 14 may be a member that connects one point of the first impact absorbing member 12 and one point of the second impact absorbing member 13. Then, a line that connects the one point of the first impact absorbing member 12 and a central axis thereof may not be parallel to a line that connects the one point of the first impact absorbing member 12 and the one point of the second impact absorbing member 13.

In summary, the first impact absorbing member 12 and the third impact absorbing member 14 may be disposed on an inside of the second impact absorbing member 13.

The first impact absorbing member 12, the second impact absorbing member 13, and the third impact absorbing member 14 may be integrally formed. As an example, the first impact absorbing member 12, the second impact absorbing member 13, and the third impact absorbing member 14 may be formed of a rubber material, but the present disclosure is not limited thereto.

The third impact absorbing member 14 may elastically support the second impact absorbing member 13 against the first impact absorbing member 12. Accordingly, as described above, a first length L1 of the wheels 10 may be smaller than a second length L2 thereof.

The third impact absorbing member 14 may extend to be inclined with respect to a radially outward direction between the first impact absorbing member 12 and the second impact absorbing member 13. The third impact absorbing member 14 may extend to be curved.

Figure 2:
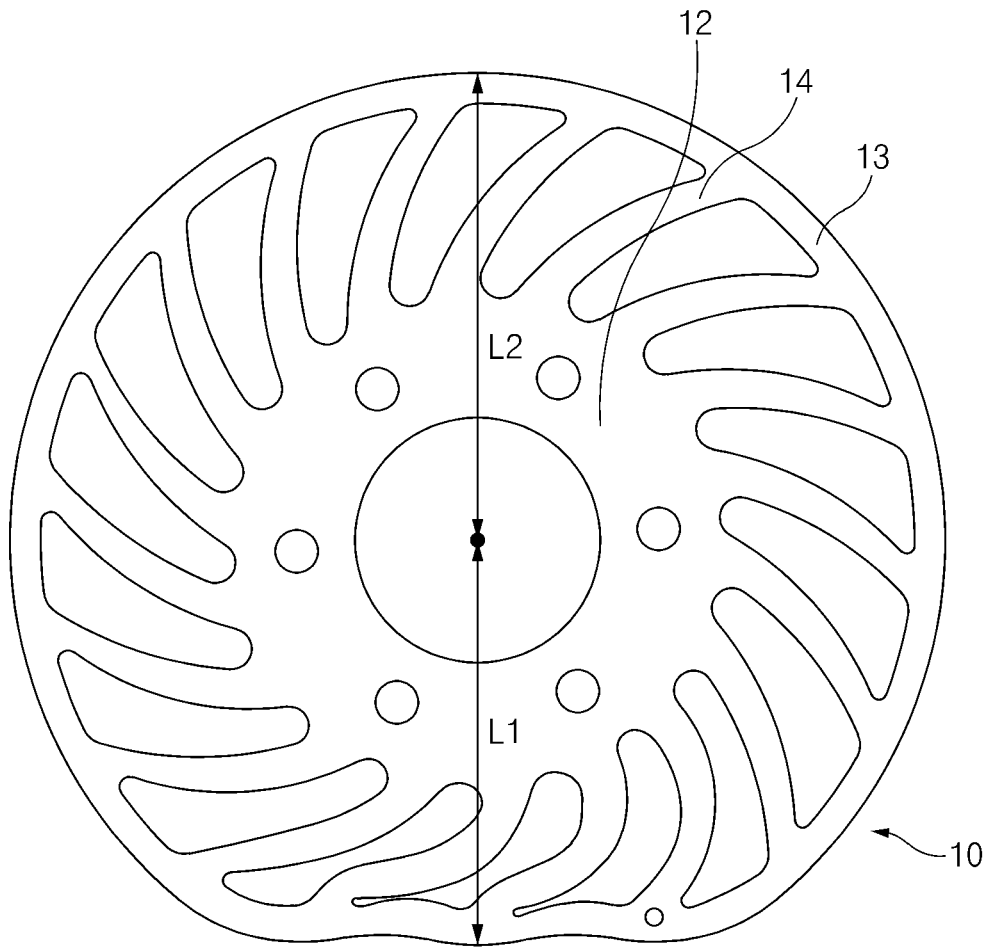
FIG. 2 shows an example of a state, in which first to third impact absorbing members are seated on a ground surface.

FIG. 2 shows an example of a state, in which the first to third impact absorbing members are seated on a ground surface. For a description, the first length L1 and the second length L2 will be defined. The first length L1 may be length that is obtained by connecting parts of the wheels 10 if the wheels 10 contact the ground surface and central axes thereof. The second length L2 may be a length of a radius of the wheels 10 if the wheels 10 do not contact the ground surface.

As shown in FIG. 2, the first length L1 of the wheels 10 may be formed to be smaller than the second length L2. This may mean that the length, which is obtained by connecting the contact parts of the wheels 10 and the central axes if the wheels 10 are pressed by the contact parts, is reduced.

The body 20 may satisfy a specific length condition. As an example, in a situation shortly before the rear wheels 10b go up a stair, the body 20 has to have a length that is more than a length, by which the front wheels 10a may be located on an upper side of the next stair. Furthermore, as an example, in a situation after the rear wheels 10b have gone up the stair, the body 20 has to have a length of less than a length, by which the front wheels 10a may contact the next stair.

Figure 3:
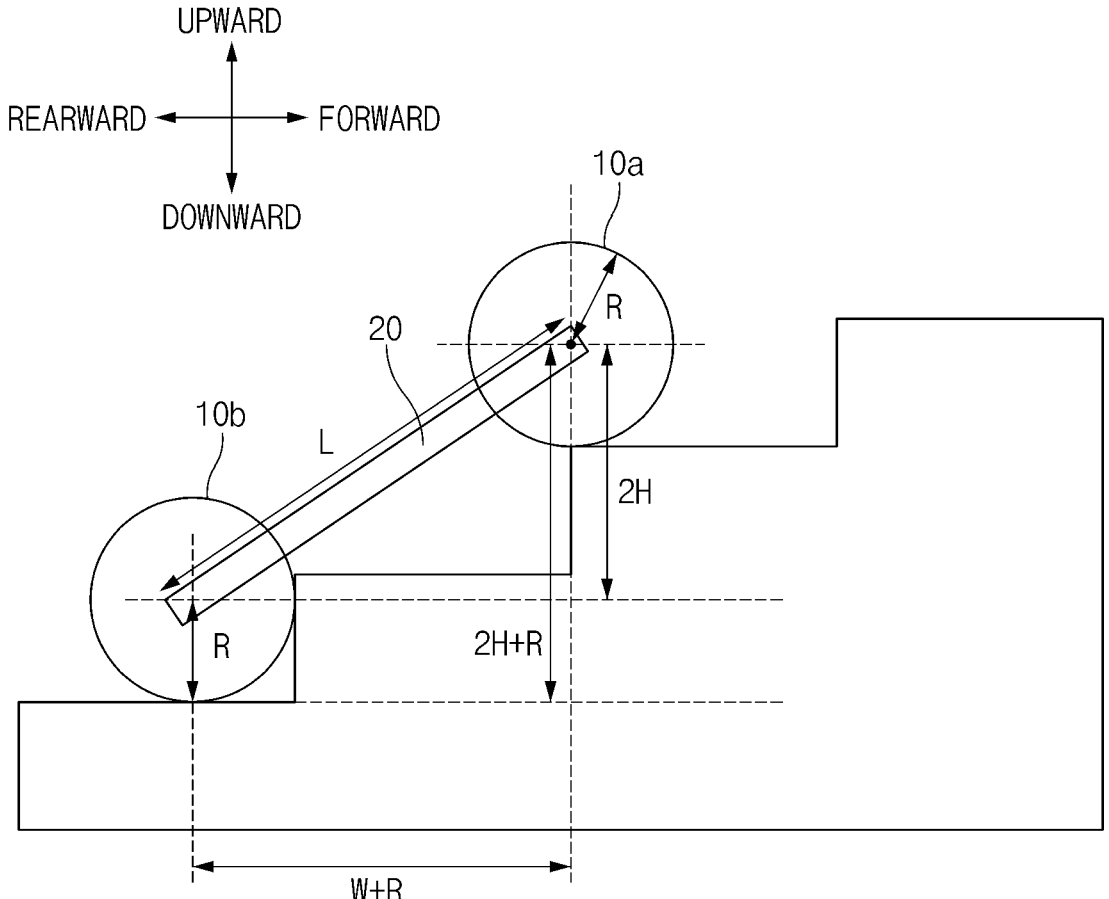
FIG. 3 shows an example of a case, in which a length of a body in a situation shortly before rear wheels of a moving body go up a stair is a length, by which front wheels may be located on an upper side of the next stair.
Figure 4:
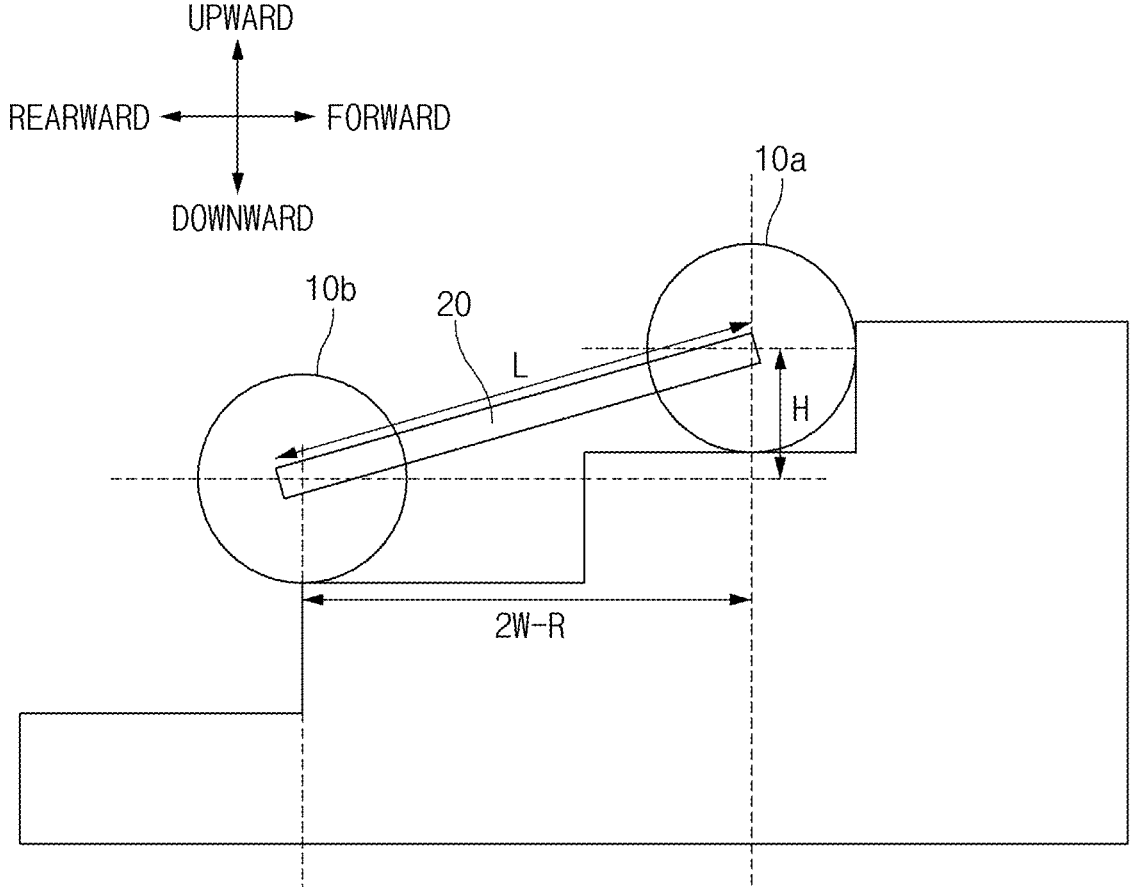
FIG. 4 shows an example of a length of a body after rear wheels of a moving body go up a stair is a length, by which front wheels may contact the next stair.

FIG. 3 shows an example of a case, in which a length of a body in a situation shortly before the rear wheels of the moving body go up a stair is a length, by which the front wheels may be located on an upper side of the next stair. FIG. 4 shows an example of a length of a body in a situation (e.g., immediately) after the rear wheels of the moving body go up a stair is a length, by which the front wheels may contact the next stair. In the following drawings, for convenience of description, the illustration of the reception part 40 (FIG. 1) is omitted. Furthermore, for convenience of illustration, FIGS. 3 and 4 show that the wheels 10 are circular, as described above, the wheels 10 may be the wheels 10, shapes of which may be changed according to the contact parts.

"L" that is a length of the body 20 may be shorter than in the case of FIG. 4. This may be expressed in an equation as follows.

In the following equation, "L" means a lengthwise length of the body 20, "H" means a height of one stair, and "W" means a width of one stair. As an example, "H" may be 0.18 m, and "W" may be 0.28 m.

"R" may mean a radius of the wheels 10, and this may correspond to the second length L2. As an example, "R" may be 0.15 m.

$$(W + R)^2 + (2H)^2 < L < (2W - R)^2 + H^2 \qquad \text{[Equation 1]}$$

The controller 30 is coupled to the body 20, and may control movement of the wheels 10. The controller 30 may be configured to acquire an angular velocity of the body 20 with respect to the ground surface. As an example, the controller 30 may include an angular velocity sensor that measures an angular velocity. The controller 30 may acquire the angular velocity that is measured by the angular velocity sensor. However, the controller 30 also may acquire an angular velocity through another auxiliary means with no angular velocity sensor. As an example, the controller 30 may include a means that continuously acquire an angle between the ground surface and the body 20.

The controller 30 may control a revolution per minute (rpm) of the wheels 10 based on the angular velocity of the body 20.

The controller 30 may include a processor and a memory. The processor may include a microprocessor, such as a field programmable gate array (FPGA), an application specific integrated circuit (ASIC), or a central processing unit (CPU). The memory may store control instructions that is a basis in generating an instruction for controlling an rpm by the processor. The memory may be a data storage, such as a hard disk drive (HDD), a solid state drive (SSD), a volatile medium, or a nonvolatile medium.

A method for detecting a step of an obstacle and a spacing distance between the wheels and the obstacle by using a laser sensor or an ultrasonic sensor to control an rpm of the wheels may be considered. In the method, a plurality of laser sensors or ultrasonic sensors that are relatively expensive have to be mounted and laser values that are measured according to the shapes of the obstacles are different, and thus, it is difficult to be applied for a general purpose. Furthermore, due to a road surface situation, it may become difficult to acquire steps and spacing distances.

According to the present disclosure, because the rpm of the wheels 10 may be controlled based on the angular velocity of the body 20, manufacturing costs may be reduced while the system is simple, and the system may be applied regardless of the states of the roads.

Hereinafter, an operation of the moving body going up a stair according to an example of the present disclosure will be described in detail. In a moment, at which the wheels 10, in particular, the rear wheels 10b cross an edge of a stair, the weight center of the moving body may be rapidly changed, and the moving body may be accelerated forwards. An operation if the moving body goes up a stair according to an example of the present disclosure may be understood as an operation for preventing the moving body from colliding with the stair due to acceleration.

Figure 5:
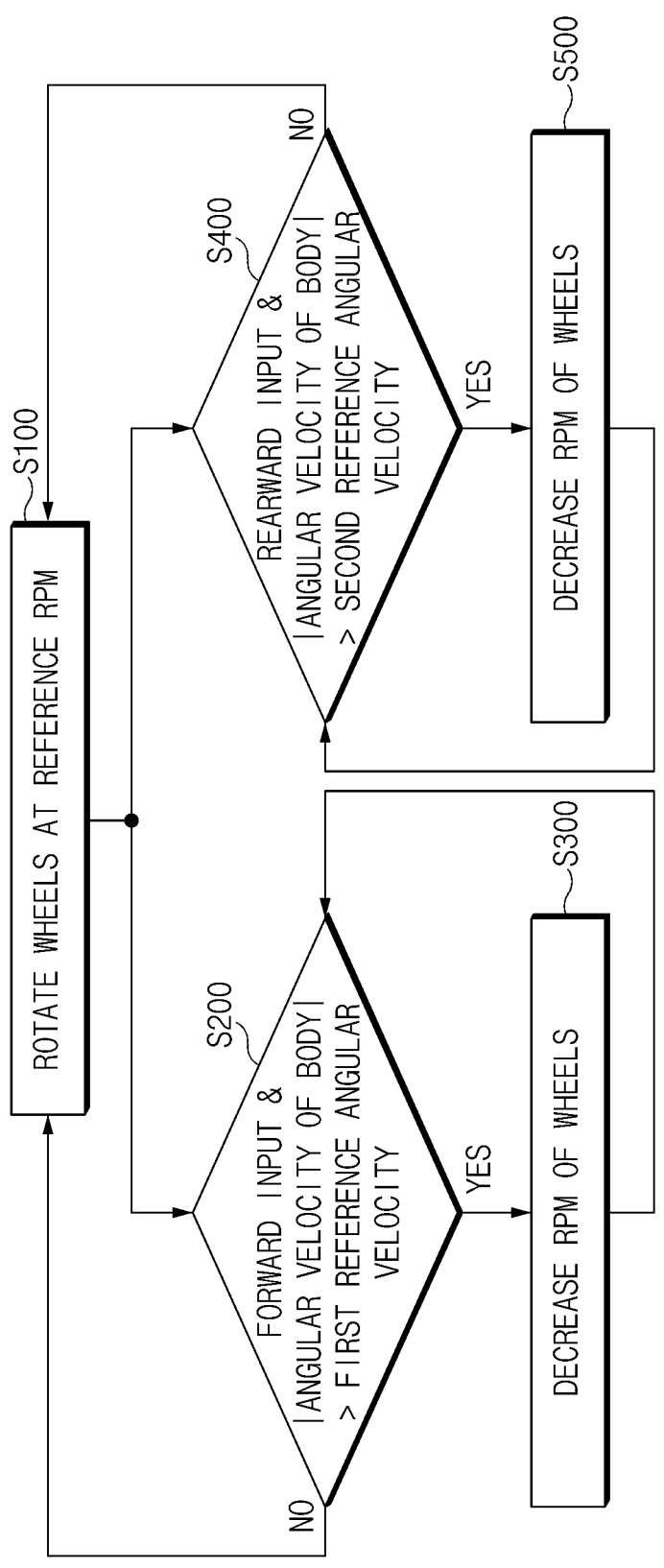
FIG. 5 shows an example of control of a moving body according to an example of the present disclosure.

FIG. 5 shows an example of control of the moving body according to an example of the present disclosure. Before the moving body meets a stair, the moving body travels while the wheels 10 are rotated at a reference rpm. If the wheels 10 are rotated such that the body 20 is moved forwards, the controller 30 may decrease the rpm of the wheels 10 if an absolute value of the angular velocity of the body 20 is more than a first reference angular velocity (S200).

The first reference angular velocity may be a value of an angular velocity of the body 20 that may be exceeded at a moment, at which the wheels 10 cross an edge of a stair. For example, the moment, at which the absolute value of the angular velocity of the body 20 exceeds the first reference angular velocity may mean a moment immediately after the wheels 10, in particular, the rear wheels 10b go up the stair.

The controller 30 may increase the rpm of the wheels 10 until the rpm of the wheels 10 becomes the reference rpm if the absolute value of the angular velocity of the body 20 is not more than the first reference angular velocity after the rpm of the wheels 10 is decreased.

Figure 6:
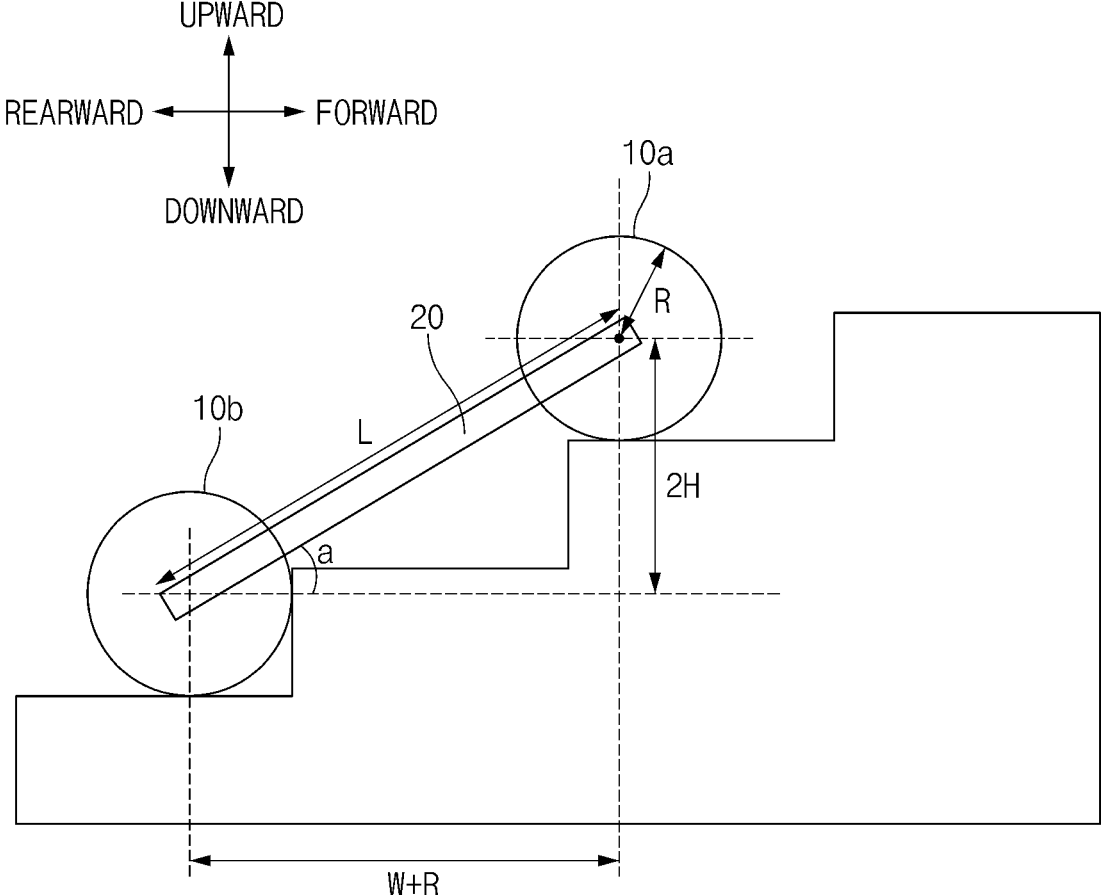
FIG. 6 shows an example of a situation shortly before rear wheels of a moving body go up a stair.
Figure 7:
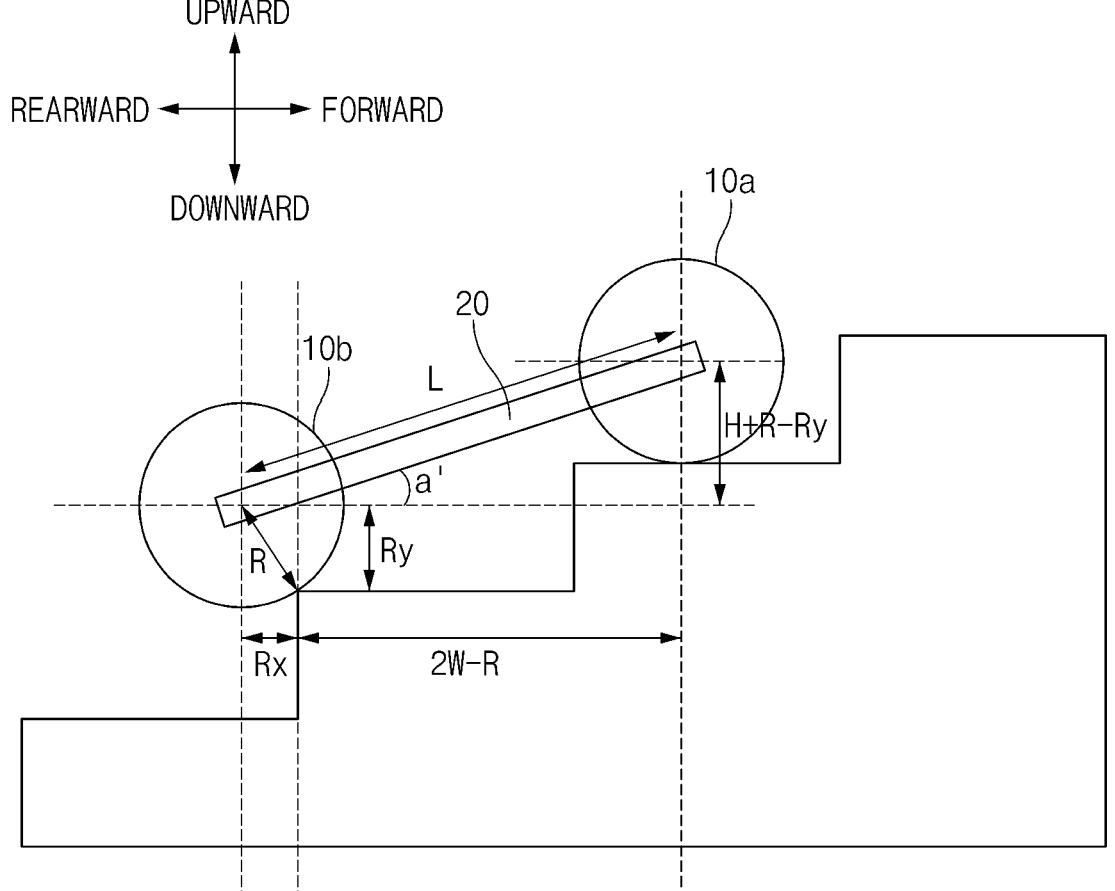
FIG. 7 shows an example of a situation after rear wheels of a moving body go up a stair.

FIG. 6 shows an example of a situation shortly before the rear wheels of the moving body go up a stair. FIG. 7 shows an example of a situation immediately after the rear wheels of the moving body go up a stair.

A process of the moving body going up a stair may be understood as a process of rotating the wheels 10 such that the body is moved forwards. Hereinafter, a forward direction will be defined as a direction, in which the body 20 is moved to go up a stair.

As described above, if the wheels 10 are rotated such that the body 20 is moved forwards, the controller 30 may decrease the rpm of the wheels 10 if the absolute value of the angular velocity of the body 20 is more than the first reference angular velocity (S200).

A moment, at which the absolute value of the angular velocity of the body 20 exceeds the first reference angular velocity, may be a moment, at which the wheels 10 cross an edge of a stair. In a moment, at which the wheels 10, in particular, the rear wheels 10b cross an edge of a stair, the weight center of the moving body may be rapidly changed, and the moving body may be accelerated forwards.

That is because an angle between the moving body and the ground surface is instantaneously significantly decreased at the edge of the stair, the absolute value of the angular velocity of the body 20 may become larger than the specific first reference angular velocity.

Here, if the rpm of the wheels 10 is not decreased, the stair and the moving body may collide with each other as the body 20 is accelerated. Accordingly, the controller 30 may prevent collision of the stair and the moving body by decreasing the rpm of the wheels 10.

As described above, the controller 30 may increase the rpm of the wheels 10 until the rpm of the wheels 10 becomes the reference rpm if the absolute value of the angular velocity of the body 20 is not more than the first reference angular velocity after the rpm of the wheels 10 is decreased. A case, in which the absolute value of the angular velocity of the body 20 is not more than the first reference angular velocity, may mean a situation, in which the front wheels 10*a* cross an edge of the stair.

Accordingly, the controller 30 may recover the rpm of the wheels 10 again after collision with the stair due to an instantaneous acceleration is prevented. The reference rpm may be an rpm of the wheels 10, by which the moving body travels on a flat surface, but the present disclosure is not limited thereto, and may be a value that may be variously set according to necessities of a user.

Meanwhile, the controller 30 may determine the first reference angular velocity through various methods. Hereinafter, an example of a method for determining the first reference angular velocity will be described in detail.

The angular velocity means an amount of an angle that is changed per time. Accordingly, the first reference angular velocity may have a value based on a value that is obtained by dividing a change rate of the angle of the body 20 if the rear wheels 10*b* pass by an edge of a stair by a time period, for which the rear wheels 10*b* pass by the edge of the stair.

As an example, the first reference angular velocity may have a value that is obtained by deriving a value that is obtained by dividing the change rate of the angle of the body 20 if the rear wheels 10*b* pass by the edge of the stair by the time period, for which the rear wheels 10*b* pass by the edge of the stair, and by multiplying the value with a reference constant "k". As an example, the reference constant "k" may be 0.7, and the present disclosure is not limited thereto and it may be adjusted according to necessities of the user.

First, an example of a method for deriving the change rate of the angle if the rear wheels 10*b* pass by the edge of the stair will be described in detail. As the example of the deriving method, the change rate of the angle is derived in an assumption that a change rate of the wheels 10 is neglected.

FIG. 6 shows an example of a situation shortly before the rear wheels of the moving body go up a stair. In FIG. 6, the angle "a" between the body 20 and the ground surface may be defined according to the following equation.

$$a = \sin^{-1}\left(\frac{2H}{L}\right) \quad \text{[Equation 2]}$$

FIG. 7 shows an example of a situation immediately after the rear wheels of the moving body go up a stair. In FIG. 7, the angle a' between the body 20 and the ground surface may be defined according to the following equation. A value of Ry means a height difference between a center of the rear wheels 10*b* and the stair which the rear wheels 10*b* contact.

$$a' = \sin^{-1}\left(\frac{H + R - Ry}{L}\right) \quad \text{[Equation 3]}$$

Meanwhile, a value Ry may be derived by combining two equations below. In the following equation, the value of Rx means a forward/rearward length difference between the center of the rear wheels 10*b* and the stair which the rear wheels 10*b* contact.

$$L^2 = (H + R - Ry)^2 + (2W - R + Rx)^2, \quad R^2 = Rx^2 + Ry^2 \quad \text{[Equation 4]}$$

In the above equation, values of "H", "L", "W", and "R" are values, which have been determined, and thus, the change rate of the angle of the body 20 may be derived through the above equations.

Figure 8:
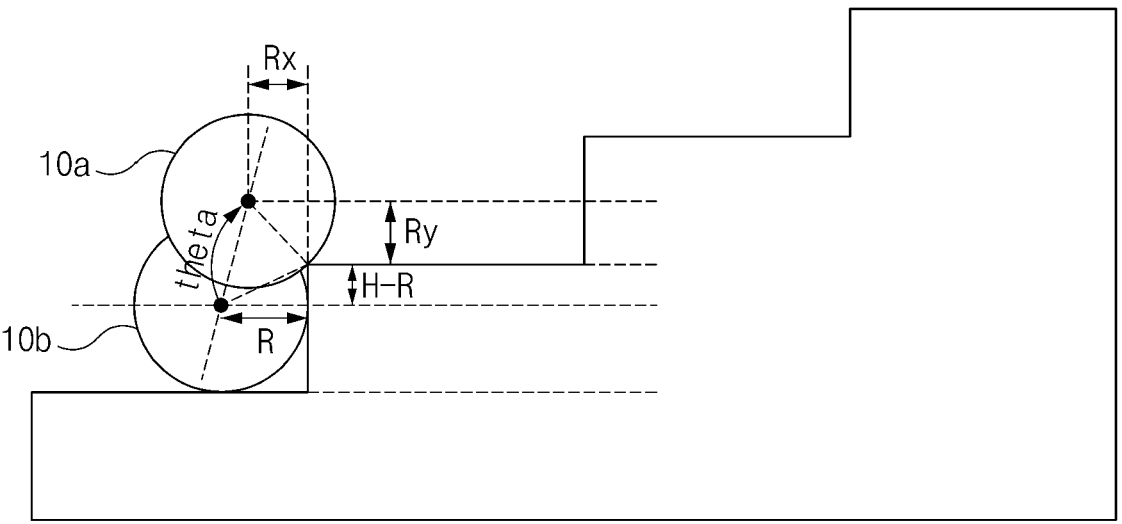
FIG. 8 shows an example of situations shortly before and after rear wheels go up a stair.

FIG. 8 shows an example of situations shortly before and immediately after the rear wheels go up a stair. For reference, FIG. 8 shows only the rear wheels 10*b* for convenience of description. In FIG. 8, a time period "t" that is taken for the rear wheels 10*b* to go up the stair may be defined according to the following equation.

Hereinafter, the time period "t" that is taken for the rear wheels 10*b* to go up the stair is derived with an assumption that motions of the rear wheels 10*b* going up the stair are rotations of points that are rotated about the edge of the stair by theta. In this process, a change of a radius of rotation is neglected. In the following equation, an rpm means a number of revolutions per minute of the wheels 10.

$$t = \frac{theta/2\pi}{RPM/60} \quad \text{[Equation 5]}$$

In the above equation, the rpm value is a value that has been determined, and the theta may be derived through the following equation.

$$theta = 2\pi - \cos^{-1}\left(\frac{Ry}{R}\right) - \tan^{-1}\left(\frac{R}{H - R}\right) \quad \text{[Equation 6]}$$

Consequently, the first reference angular velocity may be obtained as follows.

$$\text{First reference angular velocity} = k\frac{a - a'}{t} \quad \text{[Equation 7]}$$

It is apparent that the above method is a simple example of obtaining the first reference angle velocity and the first reference angular velocity may be defined through various methods. As another example, the controller 30 may determine the first reference angular velocity based on the first length L1 and the second length L2. Then, the controller 30 may derive "t" by deriving theta through the first length L1 and the second length L2. In this process, the radius of rotation may be regarded as the second length L2 that is constant.

Figure 9:
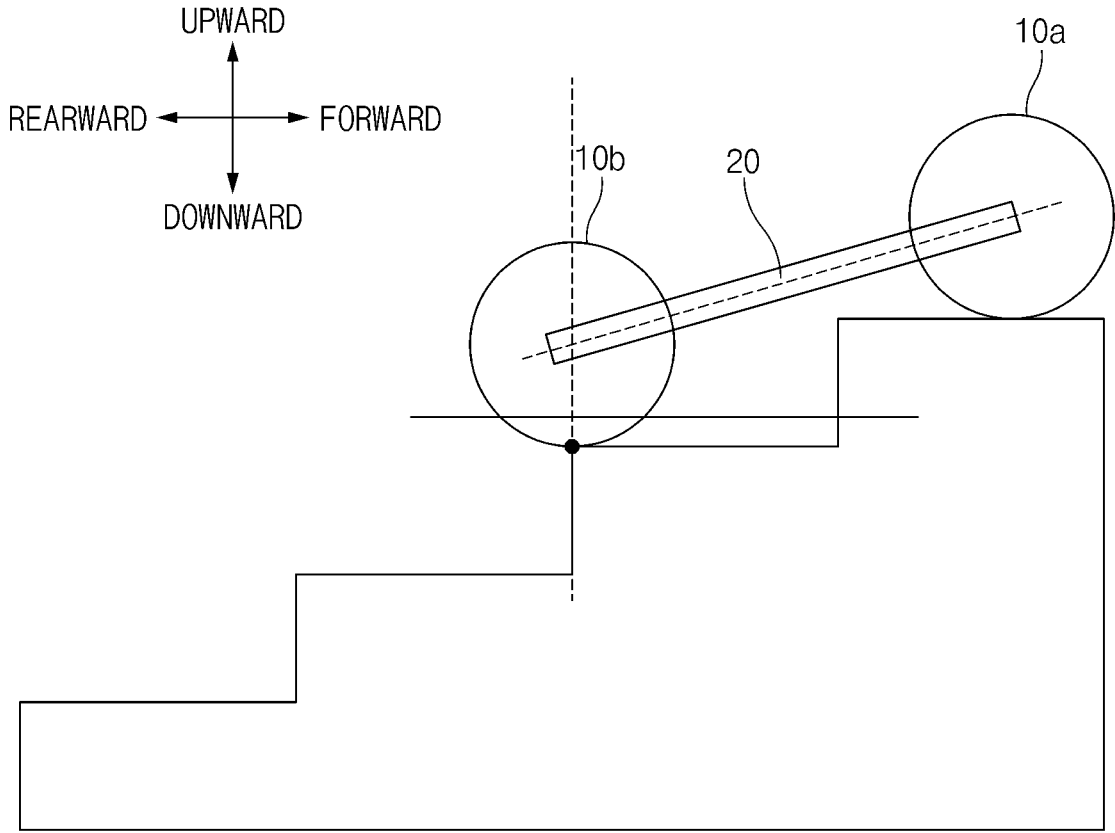
FIG. 9, FIG. 10, and FIG. 11 show examples of states, in which a moving body goes down rearwards in sequence.
Figure 10:
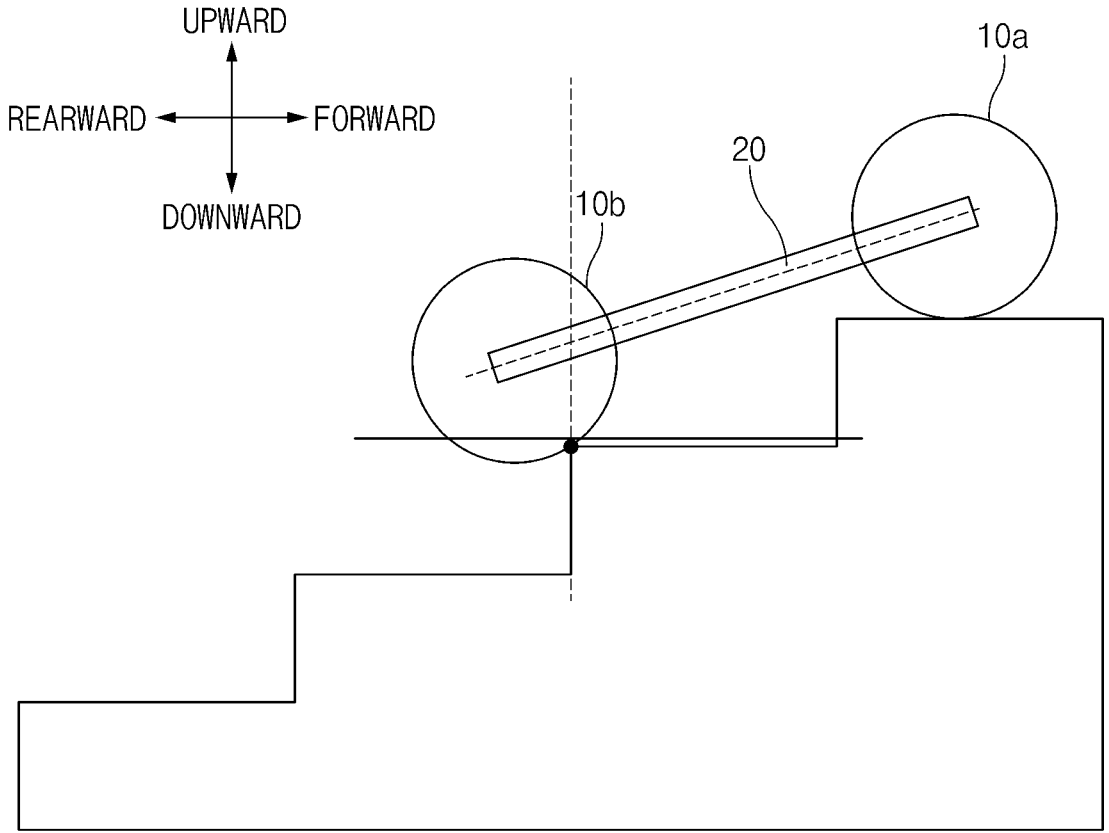
Figure 11:
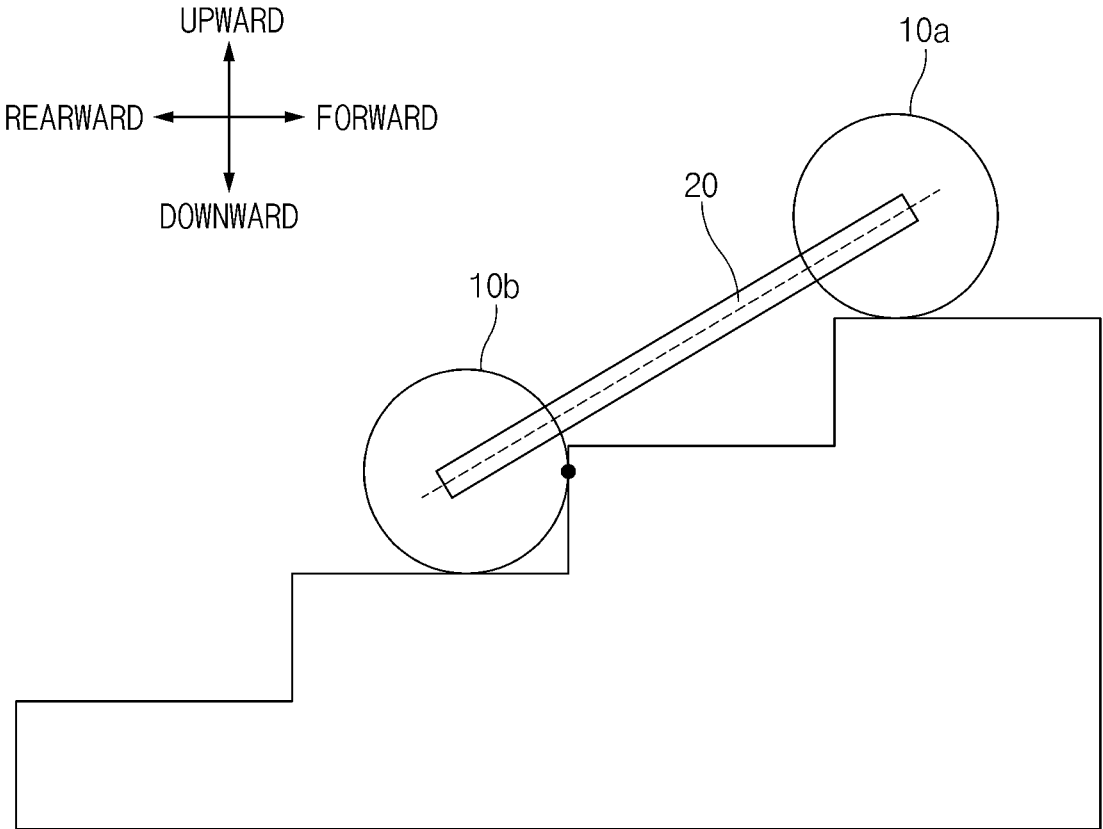

Hereinafter, an operation of the moving body moving down a stair through rearward movement thereof according to an example of the present disclosure will be described below. FIGS. 9 to 11 show examples of states, in which the moving body goes down rearwards in sequence. For reference, FIGS. 9 to 11 show that the wheel 10 are circular for convenience of description, but as described above, the shapes of the wheels 10 may be changed according to the contact parts as described above.

As shown in FIG. 5, if the wheels 10 are rotated such that the body 20 is moved rearwards, the controller 30 may decrease the rpm of the wheels 10 if the absolute value of the angular velocity of the body 20 exceeds the second reference angular velocity (S400). As an example, the second reference angular velocity may have a value corresponding to the first reference angular velocity, but may be derived through a separate method.

The first reference angular velocity may be a value of an angular velocity of the body 20, which may be exceeded at a moment, at which the wheels 10, in particular, the rear wheels 10*b* cross an edge of a stair and fall down. For example, a moment, at which the absolute of the angular velocity of the body 20 exceeds the second reference angular velocity, may be a moment, at which the wheels 10 cross an edge of a stair and fall down. At the moment, at which the wheels 10, in particular, the rear wheels 10*b* cross the edge of the stair, the rear wheels 10*b* fall down, and thus, the weight center of the moving body is rapidly changed, and the moving body may be accelerated rearwards.

At the moment, at which the moving body passes by the edge of the stair, the angle between the moving body and the ground surface is significantly increased, and thus, the absolute value of the angular velocity of the body 20 may become larger than a specific second reference angular velocity.

Accordingly, the controller 30 may decrease an impact applied to the body 20 due to the collision with the stair by decreasing the rpm of the wheels 10.

If the wheels 10 are rotated such that the body 20 is moved rearwards, the controller 30 may increase the rpm of the wheels 10 until the rpm of the wheels 10 becomes the reference rpm if the absolute value of the angular velocity of the body 20 is not more than the second reference angular velocity after the rpm of the wheels 10 is decreased (S500). A case, in which the absolute value of the angular velocity of the body 20 is not more than the second reference angular velocity may mean a situation, in which the rear wheels 10*b* have fallen down. Accordingly, the controller 30 may recover the rpm of the wheels 10 again after they have fallen down.

Figure 12:
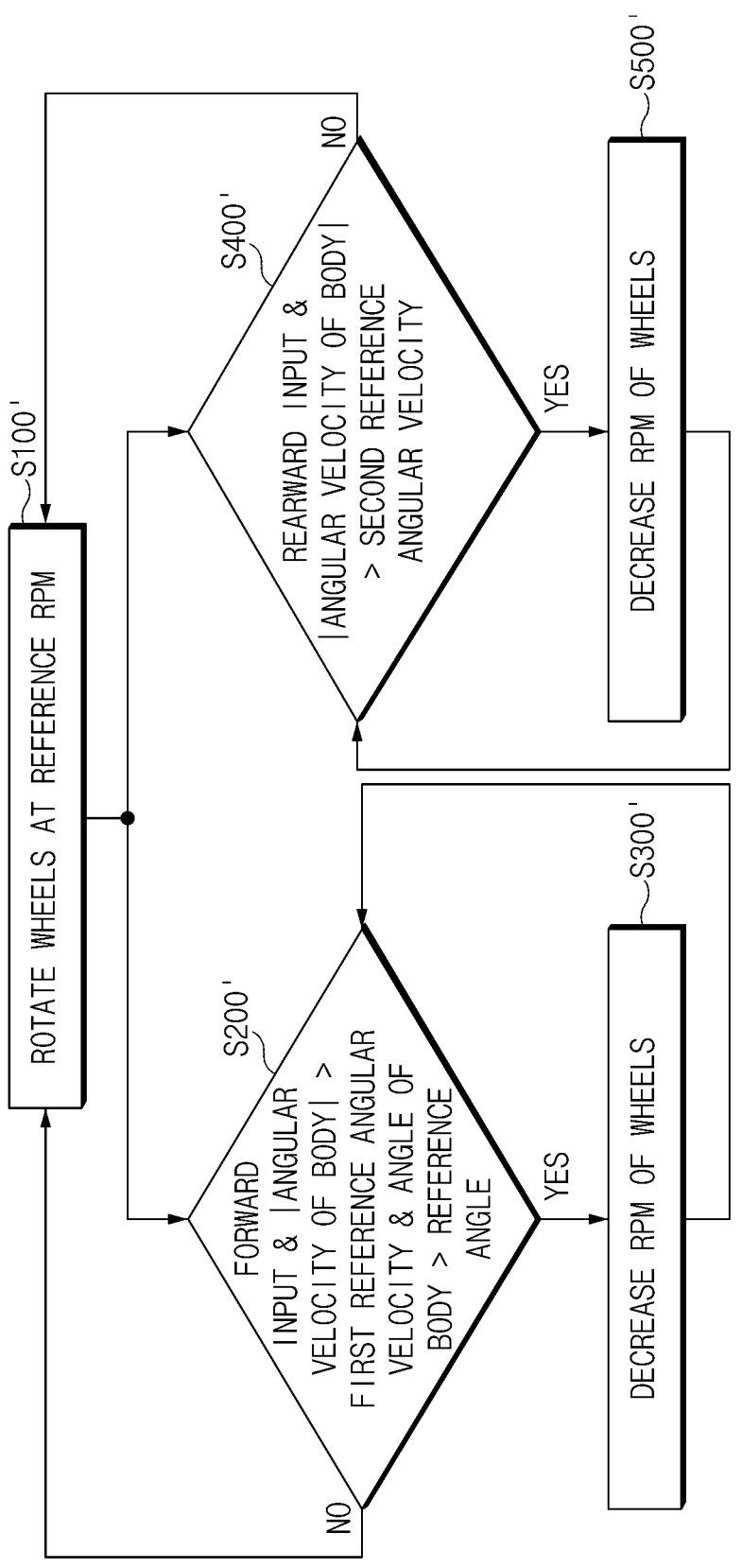
FIG. 12 shows another example of control of a moving body according to an example of the present disclosure.

FIG. 12 shows another example of control of the moving body according to an example of the present disclosure. Hereinafter, another example of control by the controller 30 will be further described in detail. A detailed description of the same or corresponding contents as or to an existing control will be omitted.

The controller 30 may be configured to acquire the angle of the body 20 with respect to the ground surface. The controller 30 may decrease the rpm of the wheels 10 if the absolute value of the angular velocity of the body 20 is more than the first reference angular velocity and the angle of the body 20 with respect to the ground surface is a reference angle or more (S200′).

The controller 30 may prevent a control for decreasing the rpm of the wheels 10 in a flat surface from being performed as the angle of the body 20 with respect to the ground surface is configured to be acquired and a condition of the angle of the body 20 with respect to the ground surface is not less than the reference angle is added.

According to the present disclosure, because the rpm of the wheels is adjusted based on a change in the angular velocity of the body, which occurs in a process of the moving body going up and down an obstacle, an impact that is generated by the collision with the obstacle in a process of overcoming the obstacle may be reduced.

The present disclosure has been made to solve the above-mentioned problems.

An example of the present disclosure provides a moving body that may reduce an impact that is generated due to a collision with an obstacle, and a method for controlling a moving body.

The technical problems to be solved by the present disclosure are not limited to the aforementioned problems, and any other technical problems not mentioned herein will be clearly understood from the following description by those skilled in the art to which the present disclosure pertains.

According to an example of the present disclosure, a moving body includes wheels, a body, to which the wheels are coupled, and a controller coupled to the body, and configured to control movement of the wheels, the controller is configured to acquire an angular velocity of the body with respect to a ground surface, and the controller controls an rpm of the wheels based on the angular velocity of the body.

In another example, the wheels may be formed such that a first length that is a length obtained by connecting parts of the wheels, which contact the ground surface if the wheels contact the ground surface, and central axes thereof are smaller than a second length obtained that is a length of a radius of the wheels if the wheels do not contact the ground surface.

In another example, if the wheels are rotated such that the body is moved forwards, the controller may decrease the rpm (e.g., rotational speed) of the wheels if an absolute value of the angular velocity of the body is more than a first reference angular velocity.

In another example, if the wheels are rotated such that the body is moved forwards, the controller may increase the rpm of the wheels until the rpm of the wheels becomes a reference rpm if the absolute value of the angular velocity of the body is not more than the first reference angular velocity after the rpm of the wheels is decreased.

In another example, the controller may be configured to acquire an angle of the body with respect to the ground surface, and if the wheels are rotated such that the body is moved forwards, the controller may decrease the rpm of the wheels if the absolute value of the angular velocity of the body is more than the first reference angular velocity and the angle of the body with respect to the ground surface is not less than a reference angle.

In another example, the wheels may be formed such that a first length that is a length obtained by connecting parts of the wheels, which contact the ground surface if the wheels contact the ground surface, and central axes thereof are smaller than a second length obtained that is a length of a radius of the wheels if the wheels do not contact the ground surface, and the controller may determine the first reference angular velocity based on the first length and the second length.

In another example, if the wheels are rotated such that the body is moved rearwards, the controller may decrease the rpm of the wheels if an absolute value of the angular velocity of the body is more than a second reference angular velocity.

In another example, if the wheels are rotated such that the body is moved rearwards, the controller may increase the rpm of the wheels until the rpm of the wheels becomes a reference rpm if the absolute value of the angular velocity of the body is not more than the second reference angular velocity after the rpm of the wheels is decreased.

In another example, the moving body may further include a reception part coupled to an upper side of the body, each of the wheels may include front wheels coupled to a front side of the body, and rear wheels coupled to a rear side of the body, and a weight center of the body may be formed on an upper side of the front wheels.

In another example, each of the wheels may include a circular frame, a circular first impact absorbing member connected to an outside of the frame, an annular second impact absorbing member spaced apart from the first impact absorbing member in a radially outward direction, and a third impact absorbing member connecting one point of the first impact absorbing member and one point of the second impact absorbing member.

In another example, the third impact absorbing member may be configured to elastically support the second impact absorbing member against the first impact absorbing member.

In another example, the third impact absorbing member may extend to be inclined with respect to the radially outward direction between the first impact absorbing member and the second impact absorbing member.

In another example, the third impact absorbing member may extend to be curved.

According to another example of the present disclosure, a moving body control method for controlling a moving body including wheels and a body, to which the wheels are coupled includes acquiring an angular velocity of the body, determining whether a magnitude of the angular velocity is not less than a specific reference angular velocity magnitude, and adjusting an rpm of the wheels based on contents of the determination.

Although the present disclosure has been described with reference to the limited examples and the drawings in the above description, the above description is simply an example description of the technical spirits of the present disclosure, and an ordinary person in the art, to which the present disclosure pertains, may made various corrections and modifications without departing from the essential characteristics of the present disclosure. Therefore, the examples disclosed in the present disclosure are not for limiting the technical spirits of the present disclosure but for describing them, and the scope of the technical spirits of the present disclosure is not limited by the examples. The protection scope of the present disclosure should be construed by the following claims, and all the technical spirits in the equivalent range should be construed as being included in the scope of the present disclosure.

What is claimed is:

1. An apparatus comprising:
a plurality of wheels;
a body coupled to the plurality of wheels; and
a controller configured to:
determine an angular velocity of the body with respect to a ground surface; and
control, based on the angular velocity, a rotational speed of the plurality of wheels,
wherein the plurality of wheels are rotated such that the body is moved forwards, and wherein the controller is configured to decrease the rotational speed of the plurality of wheels based on an absolute value of the angular velocity of the body being more than a first reference angular velocity of the body,
wherein a wheel of the plurality of wheels is configured to be dynamically shaped as moving such that a first length of the wheel becomes smaller than a second length of the wheel, wherein the first length is a first distance between:
a first point, of the wheel, that contacts the ground surface; and
a central axis of the wheel;
wherein the second length is a second distance between:
a second point, of the wheel, that does not contact the ground surface; and
the central axis of the wheel; and
wherein the controller is configured to determine the first reference angular velocity of the body based on the first length and the second length.

2. The apparatus of claim 1, wherein the controller is configured to increase the rotational speed of the plurality of wheels until the rotational speed of the plurality of wheels reaches a reference rotational speed based on the absolute value of the angular velocity of the body being not more than the first reference angular velocity after the rotational speed of the plurality of wheels is decreased.

3. The apparatus of claim 1, wherein the controller is configured to determine an angle of the body with respect to the ground surface, and wherein the controller is configured to decrease the rotational speed of the plurality of wheels based on the absolute value of the angular velocity of the body being more than the first reference angular velocity and the angle of the body with respect to the ground surface being not less than a reference angle.

4. The apparatus of claim 1, wherein the controller is configured to, while the body is moving rearwards, decrease the rotational speed of the plurality of wheels based on an absolute value of the angular velocity of the body being more than a second reference angular velocity.

5. The apparatus of claim 4, wherein the controller is configured to increase the rotational speed of the plurality of wheels until the rotational speed of the plurality of wheels reaches a reference rotational speed based on the absolute value of the angular velocity of the body being not more than the second reference angular velocity after the rotational speed of the plurality of wheels is decreased.

6. The apparatus of claim 1, further comprising:
a reception part coupled to an upper side of the body,
wherein the plurality of wheels comprise:
front wheels coupled to a front side of the body; and
rear wheels coupled to a rear side of the body,
wherein a weight center of the body is formed on an upper side of the front wheels.

7. The apparatus of claim 1, wherein each of the plurality of wheels includes:
a circular frame;
a circular first impact absorbing member connected to an outside of the circular frame;
an annular second impact absorbing member spaced apart from the circular first impact absorbing member in a radially outward direction; and
a third impact absorbing member connecting one point of the circular first impact absorbing member and one point of the annular second impact absorbing member.

8. The apparatus of claim 7, wherein the third impact absorbing member is configured to elastically support the annular second impact absorbing member against the circular first impact absorbing member.

9. The apparatus of claim 7, wherein the third impact absorbing member is extended in an inclined manner in a radial outward direction between the circular first impact absorbing member and the annular second impact absorbing member.

10. The apparatus of claim 9, wherein the third impact absorbing member is extended in a curved shape.

11. A method comprising:

determining, by a controller, an angular velocity of a body coupled to a plurality of wheels, wherein the plurality of wheels are rotated such that the body is moved forwards;

determining whether a magnitude of the angular velocity is not less than a magnitude of a reference angular velocity; and adjusting, based on the determining, a rotational speed of the plurality of wheels by decreasing, by the controller, the rotational speed of the plurality of wheels based on an absolute value of the angular velocity of the body being more than a first reference angular velocity of the body, wherein a wheel of the plurality of wheels is configured to be dynamically shaped as moving such that a first length of the wheel becomes smaller than a second length of the wheel, wherein the first length is a first distance between:
   a first point, of the wheel, that contacts a ground surface; and
   a central axis of the wheel;

wherein the second length is a second distance between:
   a second point, of the wheel, that does not contact the ground surface; and
   the central axis of the wheel; and wherein the method further comprises determining, by the controller, the first reference angular velocity of the body based on the first length and the second length.

12. The method of claim 11, further comprising:

increasing the rotational speed of the plurality of wheels until the rotational speed of the plurality of wheels reaches a reference rotational speed based on the absolute value of the angular velocity of the body being not more than the first reference angular velocity after the rotational speed of the plurality of wheels is decreased.

13. The method of claim 11, further comprising:

determining an angle of the body with respect to the ground surface, and decreasing the rotational speed of the plurality of wheels based on the absolute value of the angular velocity of the body being more than the first reference angular velocity and the angle of the body with respect to the ground surface being not less than a reference angle.

14. The method of claim 11, further comprising:

while the body is moving rearwards, decreasing the rotational speed of the plurality of wheels based on an absolute value of the angular velocity of the body being more than a second reference angular velocity.

15. The method of claim 14, further comprising:

increasing the rotational speed of the plurality of wheels until the rotational speed of the plurality of wheels reaches a reference rotational speed based on the absolute value of the angular velocity of the body being not more than the second reference angular velocity after the rotational speed of the plurality of wheels is decreased.

16. The method of claim 11, wherein:

a reception part is coupled to an upper side of the body, wherein the plurality of wheels comprise:
   front wheels coupled to a front side of the body; and
   rear wheels coupled to a rear side of the body, and wherein a weight center of the body is formed on an upper side of the front wheels.

17. The method of claim 11, wherein each of the plurality of wheels includes:

a circular frame;

a circular first impact absorbing member connected to an outside of the circular frame;

an annular second impact absorbing member spaced apart from the circular first impact absorbing member in a radially outward direction; and a third impact absorbing member connecting one point of the circular first impact absorbing member and one point of the annular second impact absorbing member.

18. The method of claim 17, wherein the third impact absorbing member is configured to elastically support the annular second impact absorbing member against the circular first impact absorbing member.

19. The method of claim 17, wherein the third impact absorbing member is extended in an inclined manner in a radial outward direction between the circular first impact absorbing member and the annular second impact absorbing member.

20. The method of claim 19, wherein the third impact absorbing member is extended in a curved shape.

* * * * *